(12) United States Patent
Dimitrov et al.

(10) Patent No.: US 8,749,924 B2
(45) Date of Patent: Jun. 10, 2014

(54) TUNED SHUNT RATIO FOR MAGNETIC SENSORS

(75) Inventors: Dimitar Velikov Dimitrov, Edina, MN (US); Dian Song, Eden Prairie, MN (US); Mark William Covington, Edina, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/231,414

(22) Filed: Sep. 13, 2011

(65) Prior Publication Data

US 2013/0065084 A1  Mar. 14, 2013

(51) Int. Cl.
    *G11B 5/33*  (2006.01)
(52) U.S. Cl.
    USPC ............ 360/320; 360/319; 360/321; 360/322
(58) Field of Classification Search
    USPC .......................................... 360/319–322, 313
    See application file for complete search history.

(56) References Cited

U.S. PATENT DOCUMENTS

| | | | |
|---|---|---|---|
| 5,576,914 A | 11/1996 | Rottmayer et al. | |
| 5,818,684 A * | 10/1998 | Iwasaki et al. | 360/319 |
| 6,333,840 B1 * | 12/2001 | Yoda et al. | 360/313 |
| 6,510,030 B1 * | 1/2003 | Song et al. | 360/319 |
| 6,665,152 B2 * | 12/2003 | Nemoto | 360/319 |
| 6,667,862 B2 * | 12/2003 | Zhu | 360/324.12 |
| 6,700,760 B1 | 3/2004 | Mao | |
| 6,731,461 B2 * | 5/2004 | Yamada et al. | 360/125.72 |
| 6,914,759 B2 | 7/2005 | Chen et al. | |
| 7,035,062 B1 | 4/2006 | Mao et al. | |
| 7,061,732 B2 * | 6/2006 | Yoshikawa et al. | 360/324.12 |
| 7,085,111 B2 | 8/2006 | Freitag et al. | |
| 7,093,347 B2 | 8/2006 | Nowak et al. | |
| 7,151,654 B1 | 12/2006 | Mao et al. | |
| 7,177,122 B2 | 2/2007 | Hou et al. | |
| 7,277,262 B2 | 10/2007 | Takagishi et al. | |
| 7,333,304 B2 * | 2/2008 | Gill et al. | 360/324.12 |
| 7,369,374 B2 | 5/2008 | Gill et al. | |
| 7,463,455 B2 * | 12/2008 | Funayama | 360/322 |
| 7,609,480 B2 * | 10/2009 | Shukh et al. | 360/125.74 |
| 7,961,437 B2 * | 6/2011 | Seagle | 360/319 |
| 2002/0051380 A1 | 5/2002 | Kamiguchi et al. | |
| 2002/0114111 A1 * | 8/2002 | Zhu | 360/324.1 |
| 2002/0141118 A1 * | 10/2002 | Nemoto | 360/319 |
| 2003/0048584 A1 * | 3/2003 | Song et al. | 360/319 |
| 2004/0109265 A1 | 6/2004 | Gill | |
| 2005/0063100 A1 | 3/2005 | Kautzky et al. | |
| 2005/0146813 A1 * | 7/2005 | Oshima | 360/324.12 |
| 2006/0245117 A1 | 11/2006 | Nowak et al. | |
| 2008/0180863 A1 * | 7/2008 | Gill | 360/324.2 |

(Continued)

FOREIGN PATENT DOCUMENTS

| | | |
|---|---|---|
| JP | 03-079331 | 4/1991 |
| JP | 10-055512 | 2/1998 |

(Continued)

*Primary Examiner* — Wayne Young
*Assistant Examiner* — Carlos E Garcia
(74) *Attorney, Agent, or Firm* — Hall Estill Attorneys at Law

(57) ABSTRACT

Various embodiments can have a data read stack positioned on an air bearing surface (ABS). The data read stack may be disposed between first and second buffer layers, where at least one of the buffer layers can be configured to provide a predetermined shunt ratio for the data read stack.

20 Claims, 5 Drawing Sheets

(56) References Cited

U.S. PATENT DOCUMENTS

| | | |
|---|---|---|
| 2009/0161268 A1 | 6/2009 | Lin |
| 2009/0168271 A1 | 7/2009 | Mauri et al. |
| 2010/0302688 A1* | 12/2010 | Shiimoto et al. ............. 360/319 |
| 2012/0099227 A1* | 4/2012 | Lueng et al. ............... 360/245.3 |

FOREIGN PATENT DOCUMENTS

| | | |
|---|---|---|
| JP | 2002-289944 A | 10/2002 |
| JP | 2004-056037 A | 9/2004 |
| JP | 2009-032382 A | 2/2009 |
| JP | 2011-119005 A | 6/2011 |

* cited by examiner

TUNED SHUNT RATIO FOR MAGNETIC SENSORS

SUMMARY

A data read stack can be positioned on an air bearing surface (ABS). The data read stack may be disposed between first and second buffer layers, where at least one of the buffer layers is configured to provide a predetermined shunt ratio for the data read stack.

DETAILED DESCRIPTION

Enhanced magnetic sensors are generally presented in the current disclosure, particularly the optimization of shunt ratio in shielded magnetic sensors. As industry demand increases for larger data capacity and faster data transfer rates, form factors of various data storage components, such as read elements and shields, decrease. A reduction in the amount of space for the read element can minimize the size of magnetic shields and the usable space between those shields.

With trilayer read elements that have dual magnetic free layer with no pinned magnetization, smaller space between shields can correspond to less effective biasing magnets. A reduction in biasing magnet strength can result in greater magnetic instability for the read element as well as degraded data sensing. Various reduced form factor shield designs can accommodate a biasing magnet, but may suffer from parasitic shunting and reduced signal amplitude through undesirable shunting current at the rear (magnetically non-responsive) portion of the read-back sensor.

Accordingly, a magnetic sensor can be constructed with an optimized shunt ratio by tuning the interface between the read element, biasing magnet, and magnetic shields to constrict current flow through the portion of the reader that is close to the air bearing surface (ABS) and enhance sensor performance. Such optimized shunt ratio can reduce or eliminate undesirable shunting effect in portions of the read element and in turn improve signal amplitude and magnetic stability of the magnetic sensor.

Figure 1:
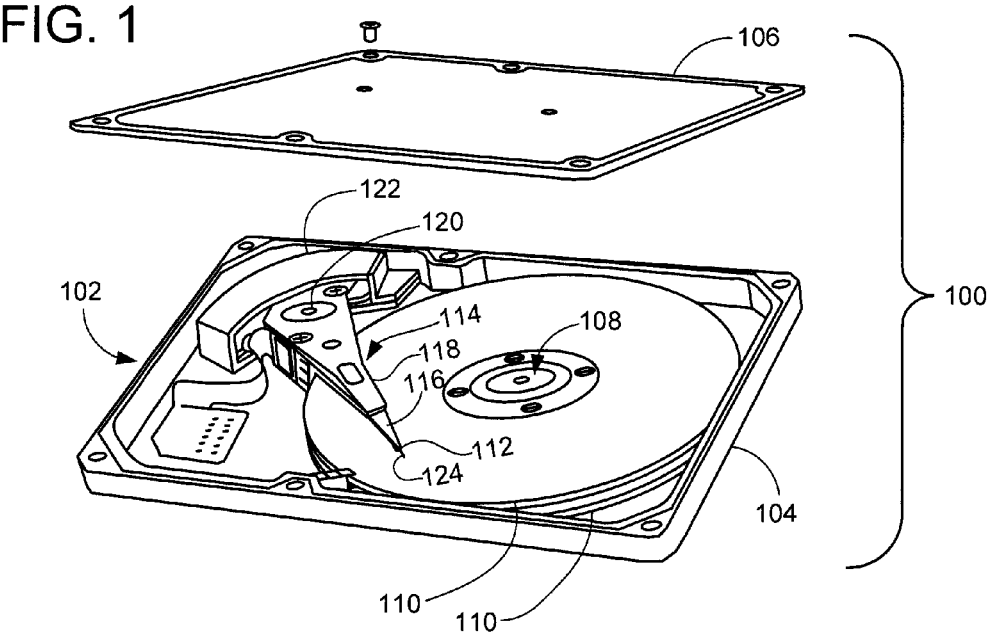
FIG. 1 is a perspective view of an example data storage device.

Turning to the drawings, FIG. 1 provides an embodiment of a data storage device 100 in a non-limiting environment in which various embodiments of the present invention can be practiced. The device 100 includes a substantially sealed housing 102 formed from a base deck 104 and top cover 106. An internally disposed spindle motor 108 is configured to rotate a number of magnetic storage media 110. The media 110 are accessed by a corresponding array of data transducers (read/write heads) that are each supported by a head gimbal assembly (HGA) 112.

Each HGA 112 can be supported by a head-stack assembly 114 ("actuator") that includes a flexible suspension 116, which in turn is supported by a rigid actuator arm 118. The actuator 114 may pivot about a cartridge bearing assembly 120 through application of current to a voice coil motor (VCM) 122. In this way, controlled operation of the VCM 122 causes the transducers (numerically denoted at 124) to align with tracks (not shown) defined on the media surfaces to store data thereto or retrieve data therefrom.

Figure 2:
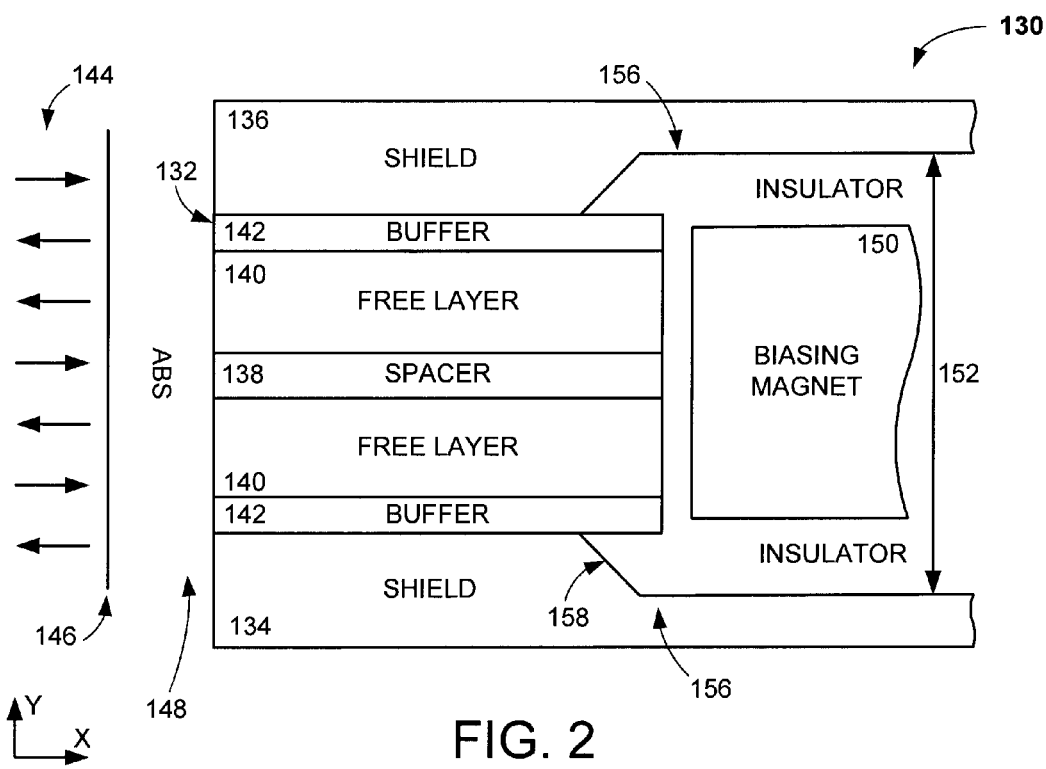
FIG. 2 shows of an example magnetic sensor capable of being used in various embodiments.

FIG. 2 generally illustrates a cross-sectional view of an embodiment of a magnetic sensor 130 capable of being used in the data storage device of FIG. 1. As shown, the sensor can be constructed with a magnetic sensing stack 132 disposed between first and second magnetic shields 134 and 136. Construction of the magnetic stack 132 is unlimited and can be a lamination of any number of layers with any magnetic orientation that is magnetically responsive. One such construction has a non-magnetic spacer layer 138 disposed between dual magnetically free layers 140 that are each coupled to buffer layers 142, which can be a variety of different materials, such as cap and seed layers.

With only the presence of magnetically free layers 140 without a pinned (or/and reference) layer with fixed magnetization, the stack 132 is conventionally described as a trilayer reader due to the three layers and the lack of any pinned magnetization in the stack 132 that implicitly ignore the seed and cap layers. To allow sensing of data bits 144 programmed on a data storage media 146 across an air bearing surface (ABS) 148 from the stack 132, a permanent magnet 150 can be positioned adjacent the stack 132 opposite from the portion that contacts the ABS 148. That is, the free layers 140 are biased by the permanent magnet 150 that can be overcome by the presence of data bits 144 to provide accurate magnetic orientation sensing.

The biasing magnet 150 may be configured with a variety of different material compositions and sizes to tune the performance of the magnetic stack 132. The first and second shields 134 and 136 can be shaped, as displayed, to provide increased separation 152 between the shields at the back edge without increasing sensor thickness along the Y axis at the ABS and enhanced magnetic flux penetration through the free layers 140 of the stack 132.

Such performance improvement is not limited to the configuration shown in FIG. 2 as the beveled portions 156 of each shield 134 and 136 can be uniquely or collectively designed with tapered, curvilinear, and orthogonal transition regions 158 that reduce the thickness of the shield(s) 134 and 136 distal to the ABS 148. Similarly, the beveled portions 156 can be partially or completely filled with a single layer or lamination of layers exhibiting magnetic and non-magnetic properties. However, the addition of one or more beveled regions 156 may correspond with minimizing parasitic shunting through the magnetic stack 132 and enhancing data read signal amplitude as electric current is more effectively concentrated at the ABS region 148 where the magnetization rotation is the largest.

Figure 3A:
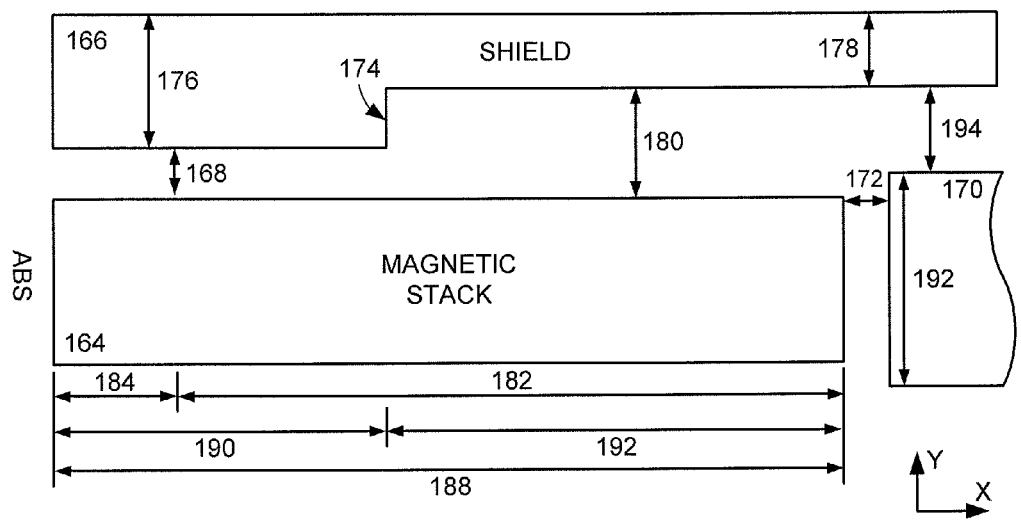
FIGS. 3A & 3B display a portion of an example magnetic sensor and a graph of example operational behavior of the magnetic sensor.
Figure 3B:
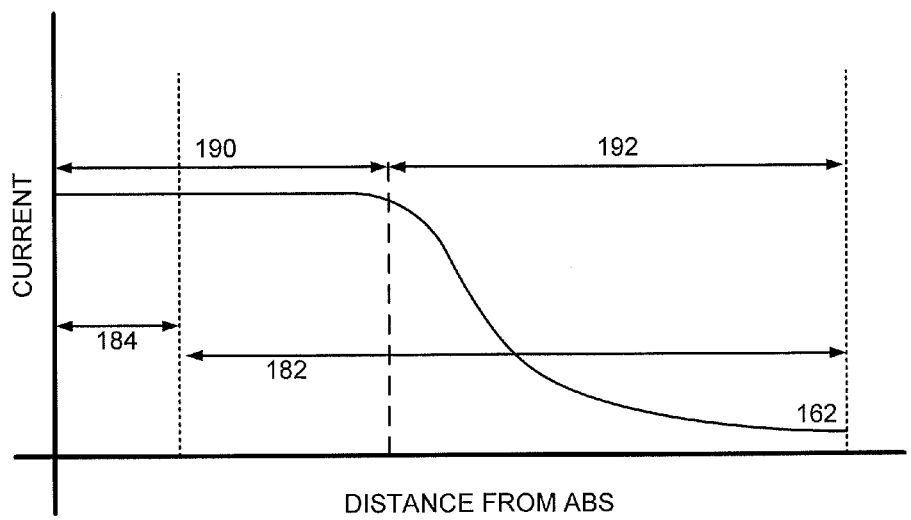

FIGS. 3A and 3B generally illustrate a cross-sectional view of a portion of an example magnetic sensor 160 and a corresponding operational graph 162. The magnetic sensor 160 has a magnetic stack 164 positioned on an ABS and spaced apart from a magnetic shield 166 by a predetermined shield distance 168 and apart from a rear biasing magnet 170 by a predetermined bias distance 172. The magnetic shield 166 has a transition region 174 shaped as a linear surface parallel to the ABS, the transition region 174 transitioning the shield 166 from a first thickness 176 at the ABS to a second thickness 178 distal to the ABS and proximal to the biasing magnet 170.

The configuration of the transition region 174 can provide a predetermined bevel distance 180 between portions of the stack 164 and the shield 166, which can correspond to a shunt length 182 that may effectively translate to negligible readback response as magnetization rotation of the stack 164 is constricted to a sensor portion 184. That is, the position and configuration of the transition region 174 can tune current response through the stack 164 by constricting current to the sensor portion 184 due to exponential current decay along the shunt region 182 of the stack 164.

Such current constriction can reduce parasitic shunting through the stack 164 distal to the ABS, which may minimize signal amplitude loss related to undesirable shunting near the biasing magnet 170. The amount of current constricted to the sensor portion 184 by the shunt portion 182 may be expressed as a constriction ratio (CC) where a value of 1 has no current passing past the transition region 174 and a value of 0 has uniform current passing throughout the stack 164 along the X axis.

While the CC may affect current behavior, operational current constriction may be a box approximation that can be affected by the stripe height 188 of the magnetic stack 164. A long stripe height, i.e. greater than 4 times the shield to shield spacing 152 of FIG. 2, may operate as though the sensor portion 184 and a shunt portion 182 are connected in parallel, with resistances of the constituent sensor and shunt portions 184 and 182 characterized as the shunt ratio.

By varying the configuration and orientation of the transition region 174, the sensor and shunt portions 184 and 182 of the stack 164 can be adjusted as beveled and unbeveled regions 190 and 192 of the magnetic shield 166 control the shunt ratio by affecting the current being conducted. Further configurability of the behavior of the stack 164 may be tuned by optimizing the bias magnet thickness 192, which corresponds to a magnet distance 194 and can provide greater biasing magnetization to the stack 164.

The various configurations and ability to tune the performance of the stack 164 and sensor 160 can allow for enhanced performance by limiting the shunt ratio between a 0 value, which corresponds to zero readback signal amplitude, and a 1 value, which reaches asymptotically the intrinsic amplitude of the sensor portion 184. As a reference, the shunt ratio can be expressed by equation 1 as follows:

$$\text{Shunt ratio} = \frac{R_{shunt}}{R_{sensor}} \quad \text{(Eq. 1)}$$

where R_shunt is the resistance of the shunt portion 182 and R_sensor is the resistance of the sensor portion 184. In some embodiments, the shunt ratio is tuned to be between in a predetermined range, such as between 0.2 and 0.6 or between 0.35 and 0.75.

Figure 4:
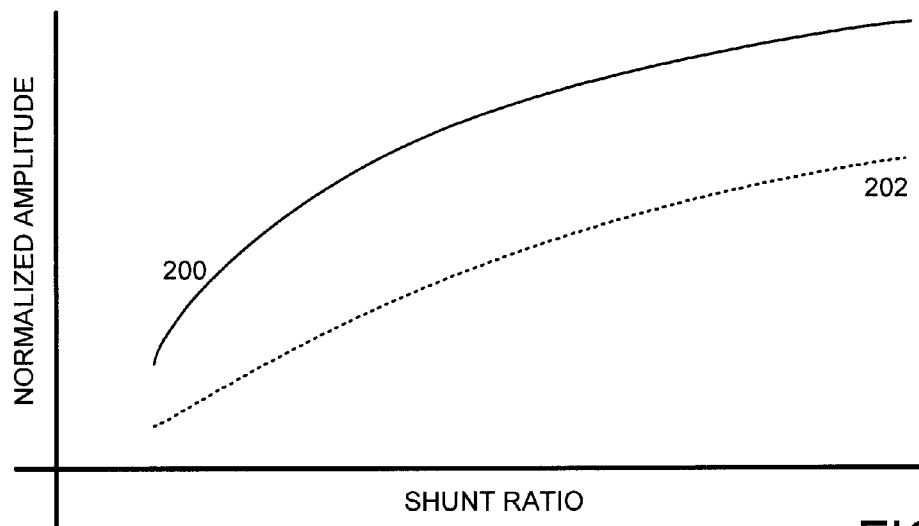
FIG. 4 plots example operational data associated with various embodiments of a magnetic sensor.

FIG. 4 generally illustrates how varying shunt ratios can correspond to readback signal amplitude when a magnetic sensor is tuned in accordance with various embodiments. Solid line 200 represents the normalized signal amplitude in relation to shunt ratio as a constant current is passed through the sensor. Segmented line 202 denotes the normalized signal amplitude for varying shunt ratios as a constant voltage is applied to the sensor.

As shown, the constriction of the current through a sensor can relate favorably to increased signal amplitude as shunt ratios increase. While adjustment of the beveled and unbeveled regions, such as regions 190 and 192 of FIG. 3, can aid in constricting current and increasing the resistance of the shunt portion, such as portion 182 of FIG. 3, modification of buffer layers, such as buffer layers 142 of FIG. 2, may further aid in optimizing the size of the shunt and sensor portions of a data reader stack.

Figure 5:
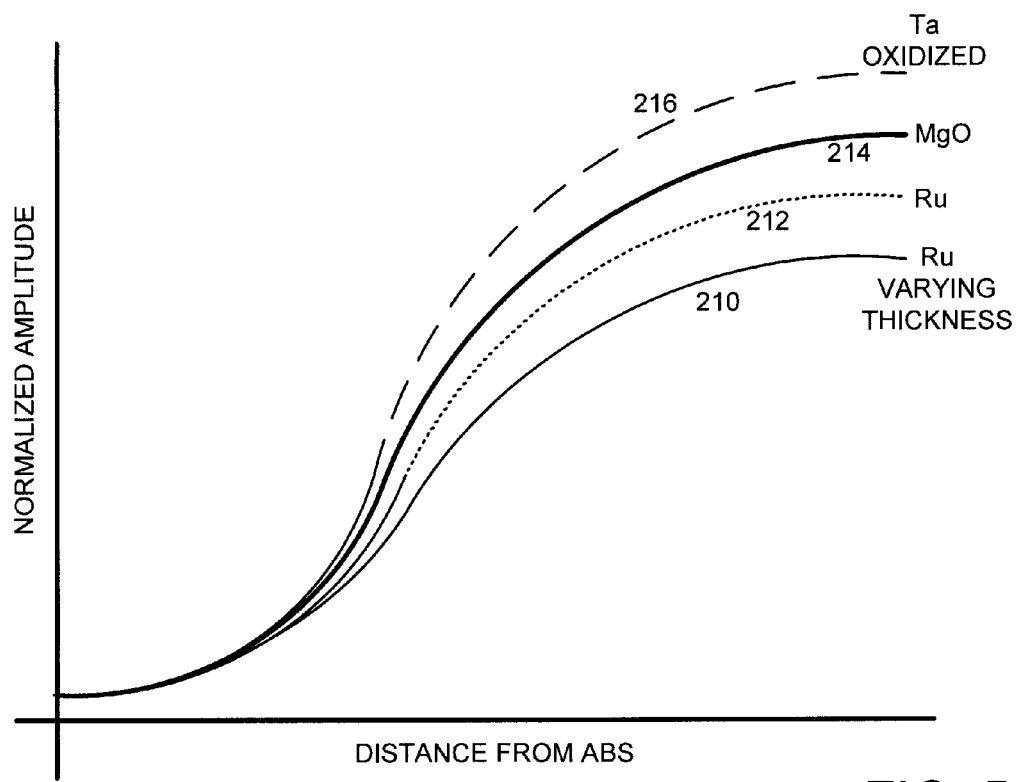
FIG. 5 graphs operational data corresponding to a variety of material compositions used in various embodiments of a magnetic sensor.

FIG. 5 graphs the normalized signal amplitude of magnetic sensor with buffer layer constructed according to a variety of embodiments. Solid line 210 illustrates how signal amplitude behaves for a buffer layer formed of Ruthenium with varying thickness in relation to distance from the ABS along the stripe height of a magnetic stack. In comparison, a Ruthenium buffer layer with a uniform thickness has relatively greater signal amplitude, as displayed by segmented line 212.

The various configurations of the buffer layers are not limited to a Ruthenium composition as a variety of other material can be used, at will, in isolation or as a lamination. Solid line 214 provides example operational signal amplitude for MgO with a uniform thickness. As shown by segmented line 216, the use of an oxidized material, such as Tantalum, $Al_2O_3$, $SiO_2$, and $TiO_2$, can provide larger signal amplitude, i.e. 23% greater amplitude, distal to the ABS than MgO and Ruthenium.

With the ability to tune magnetic sensor performance by optimizing buffer layer construction, predetermined sizes can be procured for the shunt and sensor portions of the magnetic stack, which can correspond to increased shunt ratios and greater readback signal amplitude. Performance and optimization of a magnetic sensor may further be conducted by manipulating the buffer layers with varying thicknesses and materials along the stripe height of the magnetic stack, distal to the ABS.

Figure 6A:
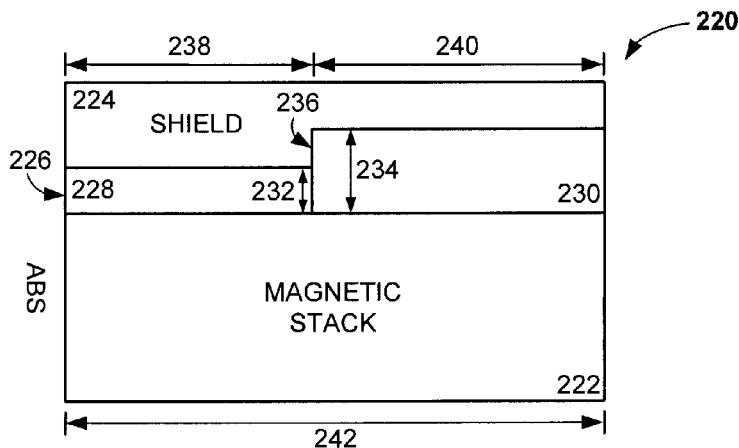
FIGS. 6A-6C display example magnetic sensor configurations in accordance with various embodiments of the present invention.
Figure 6B:
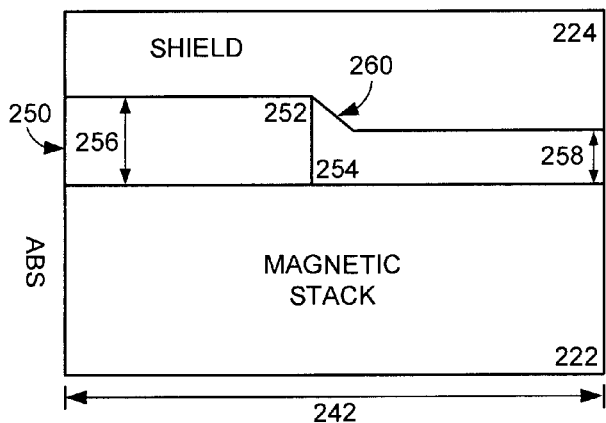
Figure 6C:
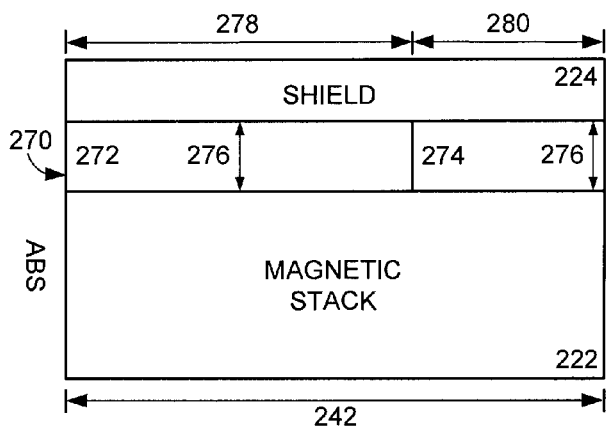

FIGS. 6A-6C display cross-sectional views of general block representations of portions of example magnetic sensors with various buffer layer embodiments. Magnetic sensor 220 shown in FIG. 6A has a magnetic stack 222 separated from a magnetic shield 224 by a buffer layer 226 that consists of a combination of first and second buffer sub-layers 228 and 230. The buffer sub-layers 228 and 230 have respective independent thicknesses 232 and 234 that correspond with the location of a transition region 236 of the magnetic shield 224. That is, each buffer sub-layer 228 and 230 has a respective length 238 and 240 that extends along the stripe height 242 of the magnetic stack, orthogonal to the ABS, and terminates at the transition region 236.

The various material configurations of the buffer layer 226 discussed above can be implemented, at will, into the buffer sub-layers 228 and 230. For example, a magnetically conductive material, such as Ruthenium and Tantalum either alone or as a lamination, can form the first buffer sub-layer 228 while a higher resistivity material or insulating material, such as MgO, is deposited as the second buffer sub-layer 230. In other embodiments, the same material is used for the first and second buffer sub-layers 228 and 230, but configured with the different, but uniform, thicknesses 232 and 234, as shown in FIG. 6A.

The ability to use different materials and thicknesses for the respective sub-layers 228 and 230 both proximal and distal to the ABS allows for optimization of the shunt ratio by tuning the lengths of the shunt and sensor portions of the magnetic stack 222 by controlling the current constriction about the transition region 236. The use of a thinner buffer sub-layer 228 near the ABS and filling the beveled region of the magnetic shield 224 with the second buffer sub-layer 230 provides signal amplitude enhancement illustrated in FIG. 5 without adding to the overall size of the sensor or the shield-to-shield spacing.

A reduced thickness first buffer sub-layer 228 can tune the shunt ratio of the magnetic stack 222, but the buffer layer 226 is not limited or restricted to such a configuration. FIG. 6B shows the magnetic sensor 220 with a buffer layer 250 having first and second buffer sub-layers 252 and 254 that reduce from a first thickness 256 at the ABS to a second thickness 258 distal to the ABS. The second sub-layer 254 also extends encompass the area underneath the tapered transition region 260, which may result in the first and second buffer sub-layers 252 and 254 having different lengths along the stripe height 242 of the stack 222.

The variability of the thicknesses, lengths, and materials of the buffer sub-layers each allow additional ability to tune the shunt ratio and optimize the readback amplitude of the sensor 220. However, variability between buffer sub-layer thicknesses is not required, as displayed by the uniform thickness buffer layer 270 of FIG. 6C.

The buffer layer 270 has first and second sub-layers 272 and 274 that may be similar or dissimilar materials, but have the same thickness 276 throughout the stripe height 242 of the magnetic stack 222. While the buffer layer thickness 276 is uniform and corresponds with a lack of a variable thickness magnetic shield 224, the lengths of the buffer sub-layers 272 and 274 can vary to tune the shunt ratio of the magnetic stack 222. That is, the first buffer sub-layer 272 can have a first length 278 that is greater than a second length 280 of the second buffer sub-layer 274, which may allow the material of the second sub-layer 274 to be farther away from the ABS and a higher shunt ratio to be established.

Figure 7:
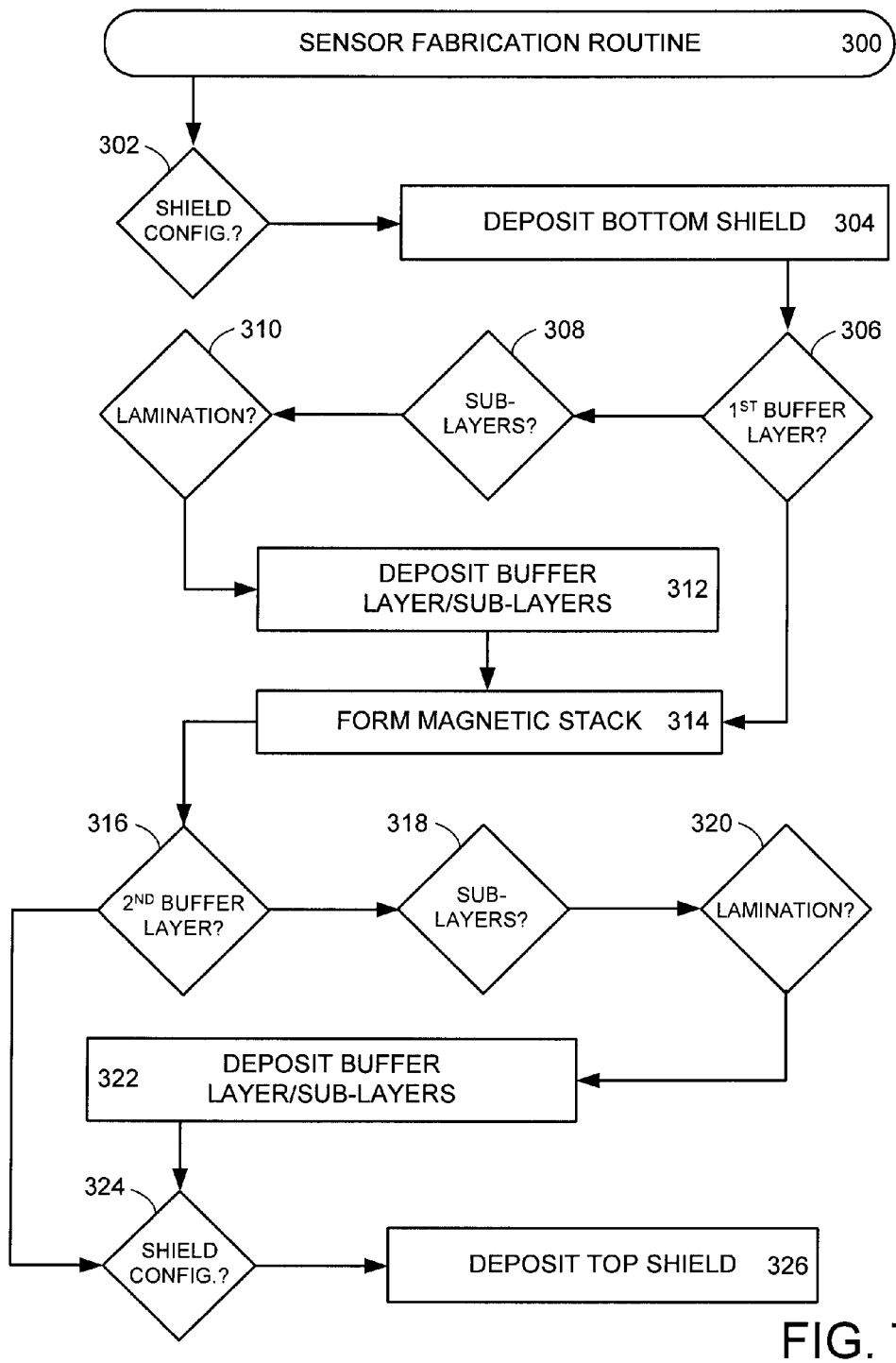
FIG. 7 provides a flowchart of a sensor fabrication routine carried out in accordance with various embodiments of the present invention.

It should be noted that the adjustability available to tune and optimize performance of a magnetic sensor is not limited to a particular configuration, method of manufacture, and method of operation. FIG. 7 generally provides an example sensor fabrication routine 300 that may be used to create the various sensor structures with predetermined performance attributes.

Initially, routine 300 evaluates a magnetic shield configuration in decision 302. The evaluation is unlimited and can analyze a variety of factors, such as thickness, length, transition region location, transition region shape, beveled region presence, and beveled region thickness reduction, which may lead to predetermined shunt and sensor portion lengths that correspond to a particular shunt ratio. The chosen shield attributes are then deposited as a bottom shield in block 304 before decision 306 determines if a first buffer layer is to be formed on the bottom shield.

Decision 306 leads to decisions 308 and 310 if a buffer layer is chosen and to block 314 if no buffer layer is to be formed. In decisions 308 and 310, various unlimited aspects of the buffer layer are determined, such as number of sub-layers, materials, thicknesses, lengths, and whether some or all of the buffer layer is to be a lamination. The determinations of decisions 308 and 310 are subsequently deposited onto the shield in block 312. It is understood that block 312 may have a number of sub-blocks that successively act to develop the first buffer layer as designed in blocks 308 and 310.

Regardless of the presence or configuration of the first buffer layer, the routine advances to block 314 where the magnetic stack is formed, which may be any stack of layers capable of sensing data, such as a trilayer. The formation of the magnetic stack in block 314 advances the routine 300 to decision 316 where the inclusion of a second buffer layer is evaluated. Much like decisions 308 and 310, decisions 318 and 320 determine the various structural and operational aspects of the second buffer layer, which are then deposited in block 322.

In the event a second buffer layer is not chosen in decision 316 or after the formation of the second buffer layer in block 322, decision 324 determines the configuration of the top shield. Similarly to decision 302, decision 324 can evaluate and choose any number of characteristics for the top shield to work in conjunction with the rest of the sensor to optimize shunt ratio and readback amplitude. That is, decision 324 can reactively evaluate the previously deposited layers of the sensor and determine the configuration of the top magnetic shield in response.

With the magnetic stack evaluated and tuned to a predetermined shunt ratio with enhanced performance through the configuration and orientation of the various buffer and shield layers, the sensor is completed at block 326 with the deposition of the top shield. It can be appreciated that a wide variety of magnetic sensor configurations can be constructed from the routine 300 with various structural and operational characteristics. However, the routine 300 is not limited only to the decisions provided in FIG. 7 as any number of blocks and determinations can be added, omitted, and modified to accommodate the fabrication of an optimized magnetic sensor.

Further of note is that no particular deposition and formation processes are required to deposit the various layers in the routine 300. For example, atomic layer deposition can be used for some layers while vapor layer deposition can be utilized for other layers. Such an ability to use various formation processes can allow further ability to tune magnetic sensor fabrication with improved manufacturing efficiency and reliability.

It can be appreciated that the configuration and material characteristics of the magnetic sensor described in the present disclosure allows for enhanced data reading performance by reducing undesirable shunting. The ability to tune various magnetic shield and buffer layers to optimize the operational size of the sensor and shunt portions of a stack can provide shunt ratios that correspond to elevated readback signal amplitude. Moreover, the capability of utilizing a number of different configurations and materials for the magnetic stack, buffer layers, and magnetic shields can allow for accurate control of sensor performance that can operate in the precise tolerances of reduced form factor data storage devices. In addition, while the embodiments have been directed to magnetic sensing, it will be appreciated that the claimed invention can readily be utilized in any number of other applications, including data storage device applications.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
a data read stack and buffer layer each positioned on an air bearing surface (ABS), the buffer layer comprising first and second buffer sub-layers, the first buffer sub-layer positioned along a uniform thickness region of a first magnetic shield on the ABS and the second buffer sub-layer positioned in a transition region of the first magnetic shield that transitions from a first thickness at the ABS to a smaller thickness distal the ABS, the first and second buffer sub-layers configured with different materials and thicknesses as measured parallel to the ABS to provide a predetermined shunt ratio for the data read stack.

2. The apparatus of claim 1, wherein the data read stack is disposed between first and second magnetic shields, the buffer layer disposed between the data read stack and the first magnetic shield.

3. The apparatus of claim 2, wherein at least one magnetic shield has a beveled portion distal to the ABS.

4. The apparatus of claim 3, wherein the beveled portion increases distance between the first and second magnetic shields along an axis parallel to the ABS.

5. The apparatus of claim 1, wherein the data read stack is a trilayer element with a plurality of magnetically free layers separated by a non-magnetic spacer layer, the trilayer element having no pinned magnetizations.

6. The apparatus of claim 3, wherein a permanent biasing magnet is positioned substantially between the first and second magnetic shields proximal to the beveled portion and distal to the ABS.

7. The apparatus of claim 1, wherein the second buffer sub-layer has a continuous varying thickness as measured parallel to the ABS along a stripe height of the data read stack as measured orthogonal to the ABS.

8. The apparatus of claim 1, wherein at least one buffer sub-layer is an insulating material.

9. The apparatus of claim 1, wherein the first buffer sub-layer has a uniform thickness and the second buffer sub-layer has a varying thickness.

10. The apparatus of claim 1, wherein the predetermined shunt ratio is between 0.35 and 0.75.

11. The apparatus of claim 1, wherein at least one buffer sub-layer has a greater resistivity than the data read stack.

12. A method comprising disposing a data read stack and a buffer layer on an air bearing surface (ABS), and configuring the buffer layer with first and second buffer sub-layers, the first buffer sub-layer positioned along a uniform thickness region of a magnetic shield on the ABS and the second buffer sub-layer positioned in a transition region of the magnetic shield that transitions from a first thickness at the ABS to a smaller thickness distal the ABS, the first and second buffer sub-layers having different materials and thicknesses as measured parallel to the ABS to provide a predetermined shunt ratio for the data read stack.

13. The method of claim 12, wherein the predetermined shunt ratio increases data readback amplitude in the data read stack.

14. The method of claim 12, wherein the predetermined shunt ratio is tuned by optimizing a sub-layer thickness and a sub-layer conductivity of at least one buffer sub-layer.

15. A sensor comprising a data read stack disposed between first and second buffer layers on an air bearing surface (ABS), the buffer layers each configured with first and second sub-layers, the first buffer sub-layer positioned along a uniform thickness region of a magnetic shield on the ABS and the second buffer sub-layer positioned in a transition region of the magnetic shield that transitions from a first thickness at the ABS to a smaller thickness distal the ABS, the first and second buffer sub-layers tuned with different materials, conductivities, and thicknesses as measured parallel to the ABS to provide a predetermined shunt ratio for the data read stack.

16. The sensor of claim 15, wherein the first and second buffer sub-layers each respectively contact the uniform thickness and transition regions of the contactingly adjacent magnetic shield, the uniform thickness region being proximal to the ABS and the transition region being distal to and separated from the ABS.

17. The sensor of claim 15, wherein the first sub-layer has a uniform first sub-layer thickness that is less than a uniform second sub-layer thickness of the second sub-layer.

18. The sensor of claim 15, wherein the first sub-layer has a uniform first thickness that is greater than an average thickness of the second sub-layer.

19. The sensor of claim 15, wherein the first sub-layer has a higher conductivity than the second sub-layer.

20. The sensor of claim 15, wherein the first sub-layer is Ruthenium and the second sub-layer is oxidized Tantalum.

* * * * *